United States Patent Office 3,591,534
Patented July 6, 1971

---

3,591,534
CURABLE STARCH ADHESIVE MANUFACTURE
Harry E. Dunholter and James C. Jones, Toledo, Ohio, assignors to Owens-Illinois, Inc.
No Drawing. Filed Dec. 10, 1968, Ser. No. 782,723
Int. Cl. C08b 25/02
U.S. Cl. 260—9
10 Claims

ABSTRACT OF THE DISCLOSURE

Water-resistant or waterproof starch-containing paperboard adhesives are manufactured from a non-water-resistant adhesive by adding an alkaline setting resin of the phenolic aldehyde or ketone-aldehyde type directly to the non-water-resistant adhesive.

---

This invention relates to the manufacture of paper products, such as corrugated paperboard or linerboard, on high speed bonding machines from a plurality of paper plies, which are joined together by an adhesive bond. More particularly, this invention relates to the manufacture of water-resistant adhesives for use in the corrugating operation, and still more particularly, to the manufacture of water-resistant and waterproof adhesives from non-water resistant starch-containing adhesives.

The operations involved in preparing corrugated paperboard or linerboard generally comprise forming a corrugated element or medium by passing a cellulosic sheet between corrugating rolls and applying an adhesive to the tips of the thus-formed flutes. Thereafter, a noncorrugated or planar cellulosic liner is applied against the adhesive-coated flutes of the corrugated element as the corrugated sheet passes between the corrugating roll and a pressure roll. The resulting single-faced element may then be used as such in certain applications, but more commonly a second liner sheet is subsequently applied to the exposed corrugated side of the single-faced element in a so-called "double facer" operation; in this case an adhesive is applied to the still exposed tips of the flutes, and the second liner is applied thereagainst. The thus formed structure is then passed through a so-called "hot-plate" dryer section, where it is heated between a continuously moving belt and a hot plate, or platen surface, to partially remove moisture from the adhesive and establish an adhesive bond. Typically, these hot plates are maintained at a temperature of about 300–400° F.

The adhesives which have been developed to form the corrugated linerboard or paperboard may generally be divided into three classes, the first of which is what is commonly termed a non-water-resistant adhesive and is traditionally used on domestic corrugated board. Henceforth, the non-water-resistant adhesives will also be referred to herein as domestic adhesives. In manufacturing a domestic adhesive composition, starch is generally gelatinized, in what is commonly termed an upper mixer, by cooking it in water in the presence of sodium hydroxide to form a starch gel. Another component of the domestic adhesive is prepared in what is generally termed the lower mixer wherein an additional amount of starch, water and borax are mixed. After the appropriate cooling and mixing times, the components of the upper mixer and lower mixer are joined and further mixed to form the domestic adhesive. Additionally, certain preservatives are generally added, the most common of which is formaldehyde. Generally, these domestic starch-containing adhesive compositions will contain seventeen (17) to twenty (20) percent or even higher amounts of starch in water. While starch may be employed in amounts which are in excess of twenty (20) percent by weight, this generally is deemed to be impractical because no added benefits are derived with additional amounts of starch. That is, a higher amount of starch increases the production cost of the domestic adhesive but does not impart any additional beneficial characteristics to the adhesive.

The other classes of adhesives used in the paper industry are referred to as water-resistant and waterproof adhesive compositions. The difference between water-resistant and waterproof adhesive compositions represents a difference in degree rather than a difference in kind. That is, both produce adhesive bonds which are resistant to water but a waterproof composition produces a bond which will have a much higher resistance than the bond produced by a water-resistant adhesive composition. The test which is recognized in the industry to determine whether or not a corrugated board is designated "waterproof" or "water-resistant" is to immerse the board in water for a period of 24 hours and subsequently evaluate the strength of the adhesive bond produced between the corrugated medium and linerboard. Although various tests exist for determining the amount of force required to separate the plies along 24 lineal inches of glue line, for the most part the bond strength evaluation is a qualitative determination. That is, the plies are typically forced apart after the 24 hour immersion and the bond strength evaluation made on the bases of the amount of cellulose fibers which are pulled from the surfaces.

Heretofore, water-resistant or waterproof adhesives have been manufactured by cooking and preparing a separate batch of adhesive to which was added a thermosettable resin in the amount of approximately 3–10% by weight based upon total starch solids. These adhesives and the resins used therein are well known in the art and reference may be had to U.S. Pats. Nos. 2,529,851, 2,626,934, and 2,884,389.

In passing, it should be noted that one distinction between the adhesives is that the water-resistant and waterproof adhesives typically will contain approximately 24–30% starch as compared to the normal 17–20% starch content of the domestic non-water-resistant adhesive composition. Thus, when a domestic adhesive composition was needed, a composition was cooked and prepared which had a starch content of 17–20%, whereas if a waterproof or water-resistant adhesive was needed, a separate composition was cooked and prepared which contained the appropriate resin and had a starch content of 24–30%.

The thermosettable resins which have been employed to manufacture adhesives which will produce a water-resistant adhesive bond (i.e., water-resistant adhesive composition are the ketone-aldehyde resins while phenolic aldehyde resins have been typically used to produce waterproof compositions. The phenolic aldehyde resins may, if desired, also be used to prepare a water-resistant adhesive composition. These resins are well known in the art and are generally a prepolymer or partial condensation reaction product of a ketone with an aldehyde or of a phenolic compound with an aldehyde. The phenolic compounds which may be employed in producing the resin include not only phenol per se but also hydroxy and alkylol substituted phenol compounds and alkyl substituted phenol compounds wherein the alkyl is a lower alkyl having up to seven carbon atoms. For example, resorcinol, meta-cresol, and 3–5 xylenol may be employed. Typical aldehydes which are employed include formaldehyde, paraformaldehyde, acetaldehyde, propionaldehyde, butyraldehyde, and higher aldehydes as well as cyclic aldehydes, such as furfural. As used herein, the term "phenolic aldehyde" thus is intended to include not only a resin which is the partial condensation reaction product of phenol and formaldehyde, which is the most common resin, but also resins prepared from the above mentioned aldehydes and modified phenol compounds. The above mentioned aldehydes may likewise be employed in manufacturing suitable ketone aldehyde resins and suitable ketones which may be used include acetone, methyl ethyl ketone, and, in general, the lower alkyl ketones.

By way of general background, it has been the practice in the industry that domestic adhesives, water-resistant adhesives, or waterproof adhesives were all manufactured as distinct, separate batches, starting with the appropriate proportions of the raw materials required for each. Thus, for example, should a run be made in a plant to produce domestic corrugated board employing a non-water-resistant adhesive and should it be desired to change over the product to a water-resistant corrugated board, it has heretofore been the general practice that a separate batch of water-resistant adhesive had to be cooked and prepared. Obviously, especially in view of the fact that it generally may take as long as two to three hours to prepare a water-resistant adhesive, this practice results in an inefficient manufacturing system. Additionally, if a new water-resistant batch or waterproof batch is prepared, and should it, for some reason, fail to accomplish its intended purpose or fail to handle properly on the machinery involved, it has generally been the practice to again prepare a new batch of adhesive.

It is the general object of this invention to provide more flexibility in the manufacture of corrugated board wherein a water-resistant or waterproof adhesive composition can be manufactured by a simple and rapid method. What applicants have now surprisingly found is that instead of requiring the cooking of a separate water-resistant or waterproof batch to obtain the desired adhesive, it is now possible to form these adhesive compositions by simply adding raw starch and the appropriate aldehyde resin directly to the domestic starch composition. It will thus be apparent that this method of manufacturing the water-resistant and waterproof compositions will now result in a manufacturing system in which there is little time lost in preparing the desired waterproof or water-resistant adhesive. Hence, the down-time is substantially minimized and a change-over from the production of domestic to either water-resistant or waterproof board may be rapidly accomplished. Typically, the change-over may be accomplished in as little as 10 to 15 minutes. Additionally, it has been surprisingly found that, especially when using a water-resistant, ketone aldehyde containing adhesive as produced by the method of this invention, the corrugating equipment may be run at substantially higher speeds than has heretofore been obtainable.

The resins which are useful in the practice of this invention are the thermosettable phenolic aldehyde and ketone aldehyde resins discussed above. They are commercially available and may be purchased from numerous suppliers, including Sun Chemical Corp., Pacific Resins & Chemicals, Inc., Anheuser-Busch, Inc., Penick and Ford Ltd., Union Carbide Corporation, and National Starch & Chemical Corp. As commercially supplied and used, these resins are water soluble and curable in the presence of starch to a thermoset condition under an alkaline pH.

Additionally, it has been found that water resistance can be increased by using an adhesive containing starch in slightly higher amounts than that typically employed in a domestic non-water-resistant adhesive composition. Consequently, suitable quantities of additional starch may be advantageously added, along with the resins, directly to the domestic starch composition to produce water-resistant and waterproof adhesives. It should be borne in mind that up to applicants' invention, it has not been thought possible to add starch and a thermosettable resin directly to a priorly prepared domestic starch adhesive and still obtain a water-resistant or waterproof adhesive; this is especially true when the resin to be added is a phenolic aldehyde and the domestic composition contains borax.

The domestic adhesive compositions to which a suitable resin and starch may be advantageously added are water suspensions containing gelatinized and ungelatinized or raw starch, borax and a suitable alkali such as, for example, sodium hydroxide. The pH of these compositions will generally be in the range of about 9.5 to 12.5 and preferably is in the range of 10.5 to 11.5. These compositions are well known in the art as they are currently widely used in the manufacture of corrugated board when water resistance is not required. Typically, these adhesives will also include small amounts of formaldehyde which is used as a preservative and will have a starch content of about 17–20% and a viscosity of about 28–35 seconds (Stein-Hall Cup) when used for a single face operation and about 45–50 seconds for a double face operation. The viscosities may, of course, be varied according to methods well known in the art such as, for example, by altering the hold mixing time in the upper mixer after the caustic has been added.

In order that there may be a more complete understanding of this invention, more detailed formulations are set forth below. It will be noted, however, that the following detailed examples are by way of illustration only and are not to be considered as limitations on the case except as indicated in the appended claims.

EXAMPLE 1

A conventional non-water-resistant (domestic) adhesive was prepared according to the following procedure. Into a top mixer was added 150 gallons of water, 200 pounds of Pearl Starch, and these ingredients were vigorously agitated for eight to ten minutes. After this agitation period, 30 pounds of borax (decahydrate) was added and the top mixer batch then heated to about 160° F. and again agitated and mixed for about ten minutes. There was then added to the top mixer batch about 22 pounds of caustic soda dissolved in about 5 gallons of water and the top mixer batch was again mixed, this time for about 13 minutes. Into a separate bottom tank was added about 385 gallons of water which was then heated to about 80° F. and then 800 pounds of Pearl Starch was added to the heated water. The cooked contents of the top mixer were then dropped into the contents of the bottom tank and the resultant adhesive composition mixed to obtain the desired viscosity. Generally, a mixing time of about 20 minutes will be sufficient for this purpose. Approximately one quart of a preservative, such as formaldehyde, was then added and the final composition was pumped to a storage tank for use in the manufacture of corrugated board. The temperature of the finished paste or adhesive was about 100–110° F. and had a pH of about 10–11.

When run on conventional machinery for producing corrugated paperboard, the above adhesive produced bonds which were easily deteriorated in the presence of water.

After the run in which the above adhesive was used to produce domestic corrugated paperboard which had a water soluble adhesive bond, a portion of the remaining priorly prepared batch was rapidly converted to a water-resistant adhesive by adding a ketone-aldehyde resin and additional starch directly to the remaining portion.

A suitable ketone-aldehyde resin which may be advantageously employed is the acetone-formaldehyde type resin commercially supplied by National Starch and Chemical Corp. as their Catalyst B. This resin, when heated by the hot plates of a corrugating machine, will take a thermoset in the presence of starch under the alkaline conditions. This product is a white to straw colored, aqueous resin solution having a pH of about 8, a solids content of about 65%, a specific gravity of 1.21 at 25° C. and a viscosity of 230 cps. when measured with a Brookfield Viscometer (No. 2 spindle at 100 r.p.m.). Thus, to a remaining 200 gallon portion of the above non-water resistant adhesive was directly added with agitation about 21.5 pounds of the resin solution and also a slurry of about 30 pounds of raw starch in two gallons of water.

The addition was done while the temperature of the non-water-resistant adhesive was about 100–105° F. and the resultant mixture agitated for about 10 minutes to produce a water-resistant adhesive composition.

The water-resistant adhesive composition was then used in the normal manner for the manufacture of corrugated paperboard, and was used on 200 pound board at a machine speed of 450 f.p.m. The hot plates had a temperature of about 325° F. After immersion in water for 24 hours, a sample of the prepared corrugated board was found to be water-resistant in that the glue line was still sufficiently intact so that cellulose fibers were pulled from the surfaces when the plies of the wet board were forced apart; this being especially true with regard to the double face side.

In passing, it should be mentioned that the changeover from the non-water-resistant adhesive to the water-resistant adhesive was accomplished in about 15 minutes. This is in marked contrast to the time it would have taken to prepare a new water-resistant adhesive as has heretofore been the practice. Additionally, not only were adhesive bonds obtained which were at least equivalent to those obtained by using conventionally prepared water-resistant adhesives, but equally important, when using the adhesives prepared according to this invention, water-resistant paperboard can be produced at a rate which is nearly fifty percent (50%) higher than the rate obtained when using a conventionally prepared water-resistant adhesive. Also, for some unobvious reason, these equivalent bonds can be produced with substantially less adhesive consumption. For example, in preparing 200 pound C flute board, a pick-up of two (2) pounds of the adhesive prepared according to this invention per one thousand (1,000) square feet of board produced an excellent water-resistant board. In contrast, conventionally prepared water-resistant adhesives, which contain an acetone-aldehyde resin, produce comparable water-resistant board with a pick-up of 3.5 pounds of adhesive per one thousand (1,000) square feet. Additionally, the water-resistant adhesive prepared as above contained about 20–21 percent (%) by weight of starch, whereas a normal, conventionally prepared water-resistant adhesive contains about 24–30%. Those skilled in the art will readily appreciate the economic benefits which are derived by using water-resistant adhesives which are prepared according to this invention.

EXAMPLE 2

Another adhesive composition was rapidly prepared from the domestic, non-water-resistant adhesive manufactured in Example 1, according to the procedure set forth below.

To another 200 gallon portion of the remaining domestic adhesive composition, while at a temperature of about 100° F., was directly added with agitation raw starch, formaldehyde and a phenolic aldehyde resin. The starch is advantageously added in sufficient quantity to generally bring the total starch content up to a level of about 20 to 21% by weight or even higher. Thus, a slurry of about 30 pounds of starch in 2 gallons of water was prepared and added to the 200 gallon portion. The phenolic aldehyde resin was added in the proportion of about 7–8% by weight of the total starch content (dry basis). One suitable phenolic aldehyde resin which may be advantageously employed is Amres 7750, a product of Pacific Resins and Chemicals, Inc. and is described in their Technical Bulletins 904–1–1a and 904–1–2a, both dated Dec. 1, 1962. This material contains a resin which is the partial condensation reaction product of formaldehyde with phenol and hydroxy substituted phenols such as resorcinol. The product is supplied as an aqueous solution containing about 45% solids and having a pH of 9–10 and a specific gravity of about 1.19 to 1.20. Thus, to the 200 gallon portion to which the starch slurry has been added as above was added about 41.5 pounds of the Amres 7750 solution. Applicants have also found it advantageous to add formaldehyde to the domestic adhesive composition in order to produce a superior water-resistant adhesive composition. Typically, the formaldehyde will be advantageously added in the ratio of about 0.3 to 0.4 pound of formaldehyde per pound of resin. Thus, there was then added to the 200 gallon portion about 18 pounds of a 37% formaldehyde solution and the resulting mixture agitated for several minutes to produce a homogeneous adhesive composition.

The composition was then employed in the normal manner for the manufacture of corrugated paperboard using a hot plate temperature of about 325° F. and, again, excellent operation was realized. After immersion in water for 24 hours, samples of corrugated board were not only found to be water-resistant but were waterproof. That is, the force per 24 lineal inches of glue line, which is required to separate plies after the 24 hour water immersion, was substantially higher than that of water-resistant paperboard.

While starch, as illustrated in Example 2, is preferably added to the domestic composition along with a phenolic aldehyde resin, it may be omitted if desired. However, if the starch is not added, such that the total starch content of the prepared adhesive remains in the range of less than about 20%, the reliability of producing a bond between the corrugated medium and the liner which is waterproof is not as great as it is when an appropriate starch content adjustment is made.

As hereinbefore indicated, the resins which are advantageously used to produce the water-resistant or waterproof adhesives from the domestic, or non-water-resistant compositions are those thermosettable resins which are water soluble when added to the domestic composition but which, when subsequently heated, for example, by the hot plates of conventional corrugated board manufacturing machinery, in an alkaline starch medium, cure or thermoset to form a water-resistant material. In general, it has been found that these resins may be advantageously added directly to the domestic composition in the proportion of about two or three to nine or ten percent by weight of the total starch content (dry basis) of the composition. Additionally, applicants have found it desirable to add sufficient raw starch directly to the priorly prepared domestic composition such that the general level of starch in the final water-resistant adhesive composition will be at least about 20–21 percent by weight or even higher.

While in the above examples, the domestic adhesive was made by the traditional Bauer Process, it will be readily appreciated by those skilled in the art that other methods of preparing the domestic adhesive, such as the more modern automated processes, may likewise be employed.

We claim:

1. A method for rapidly converting a non-water-resistant, alkaline, starch-containing paperboard adhesive composition, wherein said starch in said non-water-resistant adhesive composition is present as gelatinized and ungelatinized starch and in an amount less than about 20 percent by weight, to a water-resistant adhesive composition which comprises adding raw starch and thermosettable resin directly to said non-water-resistant adhesive composition, said resin being a member selected from the group consisting of ketone-aldehyde and phenolic aldehyde resins and being water soluble upon said addition and curable to a thermoset, water-resistant condition when heated under alkaline conditions in the presence of starch, said raw starch and said resin being added in an amount effective to convert said non-water-resistant composition to a water-resistant composition.

2. The method of claim 1 wherein said resin is an acetone formaldehyde resin.

3. The method of claim 1 wherein said resin is a ketone aldehyde resin.

4. The method of claim 1 wherein sufficient starch is added to obtain a total starch content of at least 20 percent by weight.

5. A method for rapidly converting a non-water-resistant, borax-containing, alkaline, starch-containing corrugated paperboard adhesive composition, wherein the starch content of said non-water-resistant adhesive composition is between about 17–20 percent by weight and wherein said starch is present in the form of gelatinized and ungelatinized starch, to a water-resistant adhesive composition, which comprises adding a raw starch slurry and a thermosettable ketone formaldehyde resin directly to said non-water-resistant adhesive composition, said resin being water soluble upon said addition and curable to a water-resistant condition when heated under alkaline conditions in the presence of starch, said raw starch and said resin being added in an amount effective to convert said non-water-resistant composition to a water-resistant composition and the final starch content of said water-resistant composition being at least about 20 percent by weight.

6. The method of claim 5 wherein said starch is added in an amount effective to provide a final starch content in said water-resistant composition of between 20–21 percent by weight and wherein said resin is added in the proportion of 2 to 10 percent by weight of the total starch content.

7. A method for rapidly converting a borax and starch containing, non-water resistant corrugated paperboard adhesive composition having an alkaline pH, wherein said starch is present as gelatinized and ungelatinized starch and the starch content is between about 17–20 percent by weight, to a waterproof adhesive composition which comprises directly adding to said non-water resistant adhesive composition a raw starch slurry and a thermosettable phenolic formaldehyde resin, said resin being water soluble when added and curable to a waterproof condition when heated in the presence of starch under alkaline conditions, the amount of starch added being sufficient to produce a starch content of at least 20 percent by weight and the amount of resin added being about 2 percent to 10 percent by weight of the total starch content.

8. The method of claim 7, wherein said resin is a partial condensation reaction product of formaldehyde with a member selected from the group consisting of phenol, hydroxy-substituted phenol, alkylol-substituted phenol and alkyl-substituted phenol wherein said alkyl contains up to seven carbon atoms.

9. The method of claim 7 wherein said phenolic resin is a resorcinol formaldehyde resin.

10. The method of claim 9 wherein said thermosettable resin is added in the proportion of about 7–8% by weight of the total starch content.

References Cited

UNITED STATES PATENTS

| | | | |
|---|---|---|---|
| 3,487,033 | 12/1969 | McElmury | 260—17.3 |
| 3,182,031 | 5/1965 | Bauer et al. | 260—17.2 |
| 3,294,716 | 12/1966 | Pinney | 260—17.2 |
| 3,476,695 | 11/1969 | Miller et al. | 260—17.2 |

OTHER REFERENCES

Tappi, August 1967, vol. 50, No. 8, Maryanski et al., "Partially Swelled Starch System as a Homogeneous Corrugating Adhesive," p. 57A.

WILLIAM H. SHORT, Primary Examiner

E. WOODBERRY, Assistant Examiner

U.S. Cl. X.R.

161—264; 260—17.2R